(12) United States Patent
Kim et al.

(10) Patent No.: US 10,567,998 B2
(45) Date of Patent: Feb. 18, 2020

(54) METHOD AND DEVICE FOR ACTIVATING OR DEACTIVATING TERMINAL-BASED TRAFFIC STEERING

(71) Applicant: LG ELECTRONICS INC., Seoul (KR)

(72) Inventors: Sangwon Kim, Seoul (KR); Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 109 days.

(21) Appl. No.: 15/566,297

(22) PCT Filed: Apr. 14, 2016

(86) PCT No.: PCT/KR2016/003870
§ 371 (c)(1),
(2) Date: Oct. 13, 2017

(87) PCT Pub. No.: WO2016/167559
PCT Pub. Date: Oct. 20, 2016

(65) Prior Publication Data
US 2018/0092000 A1    Mar. 29, 2018

Related U.S. Application Data

(60) Provisional application No. 62/161,873, filed on May 14, 2015, provisional application No. 62/148,148, filed on Apr. 15, 2015.

(51) Int. Cl.
*H04W 28/08*   (2009.01)
*H04W 28/02*   (2009.01)
*H04W 48/16*   (2009.01)

(52) U.S. Cl.
CPC .......... *H04W 28/08* (2013.01); *H04W 28/02* (2013.01); *H04W 48/16* (2013.01)

(58) Field of Classification Search
CPC ..... H04W 28/02; H04W 28/08; H04W 24/10; H04W 48/16
See application file for complete search history.

(56) References Cited

U.S. PATENT DOCUMENTS

| | | |
|---|---|---|
| 2015/0038142 A1 | 2/2015 | Wang et al. |
| 2015/0043447 A1 | 2/2015 | Stojanovski et al. |
| 2015/0350990 A1* | 12/2015 | Fujishiro ............... H04W 48/18 370/331 |
| 2016/0014678 A1* | 1/2016 | Syed ..................... H04W 48/16 370/338 |
| 2017/0367010 A1* | 12/2017 | Jia ......................... H04W 28/08 |

FOREIGN PATENT DOCUMENTS

| | | |
|---|---|---|
| KR | 10-2015-0026759 A | 3/2015 |
| WO | WO 2014/165832 A1 | 10/2014 |
| WO | WO 2014/175672 A1 | 10/2014 |

* cited by examiner

*Primary Examiner* — Kevin C. Harper
(74) *Attorney, Agent, or Firm* — Birch, Stewart, Kolasch & Birch, LLP

(57) ABSTRACT

Provided are a method of activating or deactivating terminal-based traffic steering by a terminal in a wireless communication system, and a device for supporting the same. The terminal performs terminal-based traffic steering, and transmits WLAN offloading information indicating a RAN/WLAN interworking state to a network, wherein the terminal-based traffic steering may be traffic steering on the basis of a RAN rule or ANDSF.

13 Claims, 18 Drawing Sheets

FIG. 12
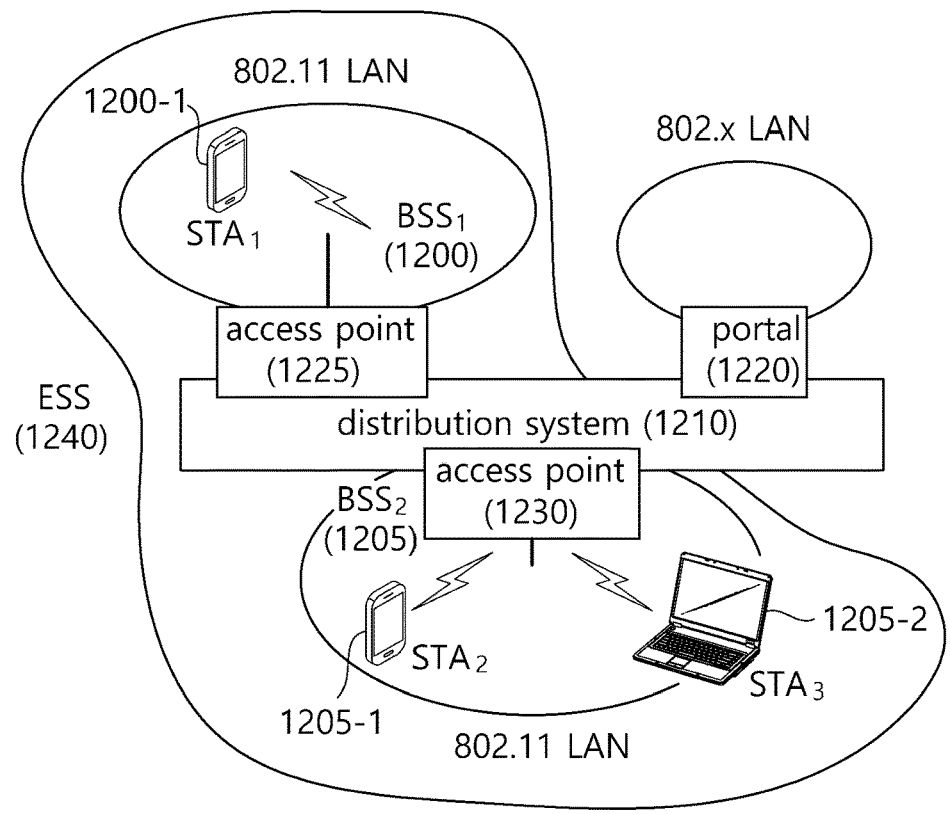
(a)
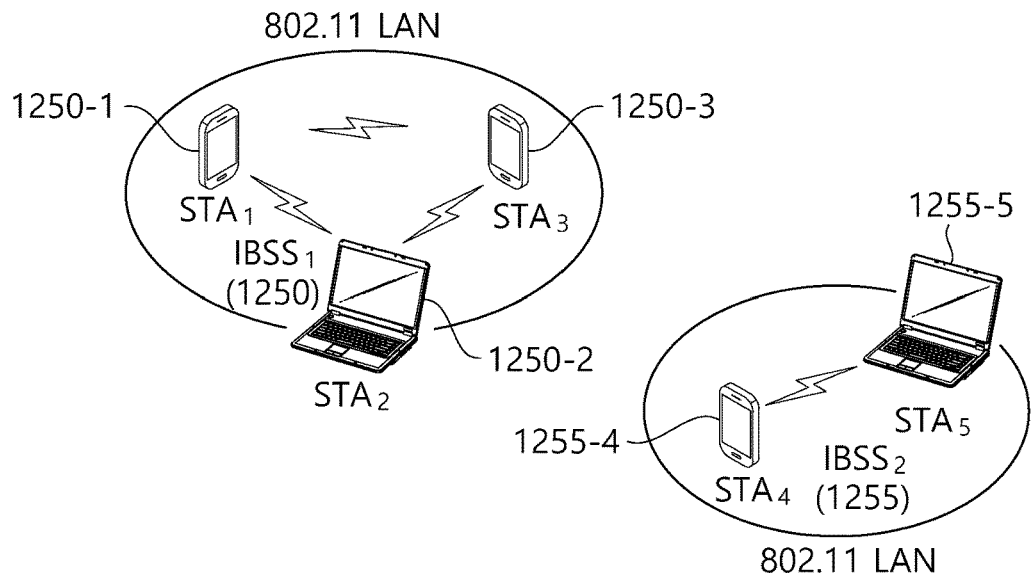
(b)

METHOD AND DEVICE FOR ACTIVATING OR DEACTIVATING TERMINAL-BASED TRAFFIC STEERING

CROSS REFERENCE TO RELATED APPLICATIONS

This application is the National Phase of PCT International Application No. PCT/KR2016/003870, filed on Apr. 14, 2016, which claims priority under 35 U.S.C. 119(e) to U.S. Provisional Application No. 62/148,148, filed on Apr. 15, 2015 and 62/161,873 filed on May 14, 2015, all of which are hereby expressly incorporated by reference into the present application.

BACKGROUND OF THE INVENTION

Field of the Invention

The present invention relates to a wireless communication system, and more particularly, to a method for activating or deactivating UE-based traffic steering by a UE in a wireless communication system, and a device supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Meanwhile, a wireless communication system may need to estimate an uplink channel or downlink channel to transmit/receive data, to achieve system synchronization, and to feed back channel information. In a wireless communication system environment, fading occurs by multipath time delay. A process of recovering a transmitted signal by compensating for a signal distortion caused by drastic environmental changes by fading is referred to as channel estimation. Further, it is needed to measure a channel state with respect to a cell to which a user equipment (UE) belongs or another cell. For channel estimation or channel state measurement, channel estimation is generally performed using a reference signal (RS) known between a transmitter and a receiver.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function associated with a bandwidth in which RSSI is measured.

A wireless communication system may provide a service to a UE through a plurality of access networks. The UE may receive a service from a 3GPP access network such as a mobile wireless communication system. Further, the UE may receive the service from a non-3GPP access network such as WiMAX (Worldwide Interoperability for Microwave Access) or a WLAN (Wireless Local Area Network).

Generally, the UE may establish connection with a 3GPP access network to receive the service. Meanwhile, when traffic overload is generated in a 3GPP access network, if traffic to be processed by the UE is processed by another access network, that is, the non-3GPP access network, the whole efficiency of the network may be improved. As described above, changeable process of the traffic through the 3GPP access network and/or the non-GPP access network refers to traffic steering so that the traffic is changeably processed through a 3GPP access network and/or a non-GPP access network.

For the traffic steering, a policy for interworking of the 3GPP access network and/or the non-GPP access network such as ANDSF (Access Network Discovery and Selection Functions) may be configured in the UE. The above policy is managed independently from an interworking policy configured by the network.

SUMMARY OF THE INVENTION

When an Rel-12 WLAN AP and an Rel-13 WLAN AP are deployed together around a UE and the UE supports UE-based traffic steering in Rel-12 and RAN/WLAN aggregation in Rel-13, a collision may occur between UE-based traffic steering in Rel-12 and RAN/WLAN aggregation in Rel-13. For example, traffic controlled by a network according to an Rel-13 RAN/WLAN aggregation start command may be readjusted by UE-based traffic steering. The present invention proposes a method in which a UE activates or deactivates UE-based traffic steering to prevent a collision between UE-based traffic steering in Rel-12 and RAN/WLAN aggregation in Rel-13, and a device supporting the same.

According to one embodiment, there is provided a method for activating or deactivating, by a UE, UE-based traffic steering in a wireless communication system. The method may include: performing UE-based traffic steering; and transmitting Wireless Local Area Network (WLAN) offloading information indicating a Radio Access Network (RAN)/WLAN interworking state to a network, wherein the UE-based traffic steering may be traffic steering based on an RAN rule or Access Network Discovery and Selection Functions (ANDSF).

The method may further include receiving, by the UE, a traffic steering deactivation message from the network, wherein the traffic steering deactivation message may be a message for prohibiting the UE-based traffic steering. The method may further include stopping, by the UE, the UE-based traffic steering. The method may further include steering, by the UE, traffic steered to the WLAN to an RAN.

The method may further include receiving, by the UE, a traffic steering activation message from the network, wherein the traffic steering activation message may be a message for allowing the UE-based traffic steering. The traffic steering activation message may be a UE-specific message.

The method may further include receiving, by the UE, an RAN/WLAN aggregation start command from the network. The method may further include stopping, by the UE, the UE-based traffic steering when there is traffic steered to the WLAN. The method may further include steering, by the UE, the traffic steered to the WLAN to an RAN.

The method may further include receiving, by the UE, an RAN/WLAN aggregation stop command from the network.

The WLAN offloading information may include at least one of serving AP information, APN information steered to the WLAN, PDN information steered to the WLAN, radio bearer information to be steered to the WLAN, EPS bearer information to be steered to the WLAN, APN information to be offloadable to the WLAN, PDN information to be offloadable to the WLAN, radio bearer information to be offloadable to the WLAN, EPS bearer information to be offloadable to the WLAN, and QoS information on traffic steered to the WLAN.

The WLAN offloading information may include an amount of data transmitted or received during a predefined period of time.

The WLAN offloading information may be transmitted to the network after the UE initiates an RRC connection establishment procedure, after the UE has successfully completed the RRC connection establishment procedure, after the UE receives a request for the WLAN offloading information from the network, or after the UE receives an RAN/WLAN aggregation command.

The WLAN offloading information may be transmitted to the network when an event report condition for WLAN measurement is satisfied or when the WLAN offloading information is changed.

According to another embodiment, there is provided a UE activating or deactivating UE-based traffic steering in a wireless communication system. The UE may include: a memory; a transceiver; and a processor to connect the memory and the transceiver, wherein the processor may be configured to: perform UE-based traffic steering; and control the transceiver to transmit WLAN offloading information indicating an RAN/WLAN interworking state to a network, and the UE-based traffic steering may be traffic steering based on an RAN rule or ANDSF.

A collision with RAN/WLAN aggregation specified in Rel-13 may be solved by activating or deactivating UE-based traffic steering.

BRIEF DESCRIPTION OF THE DRAWINGS

FIG. 12 illustrates the structure of a wireless local area network (WLAN)

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
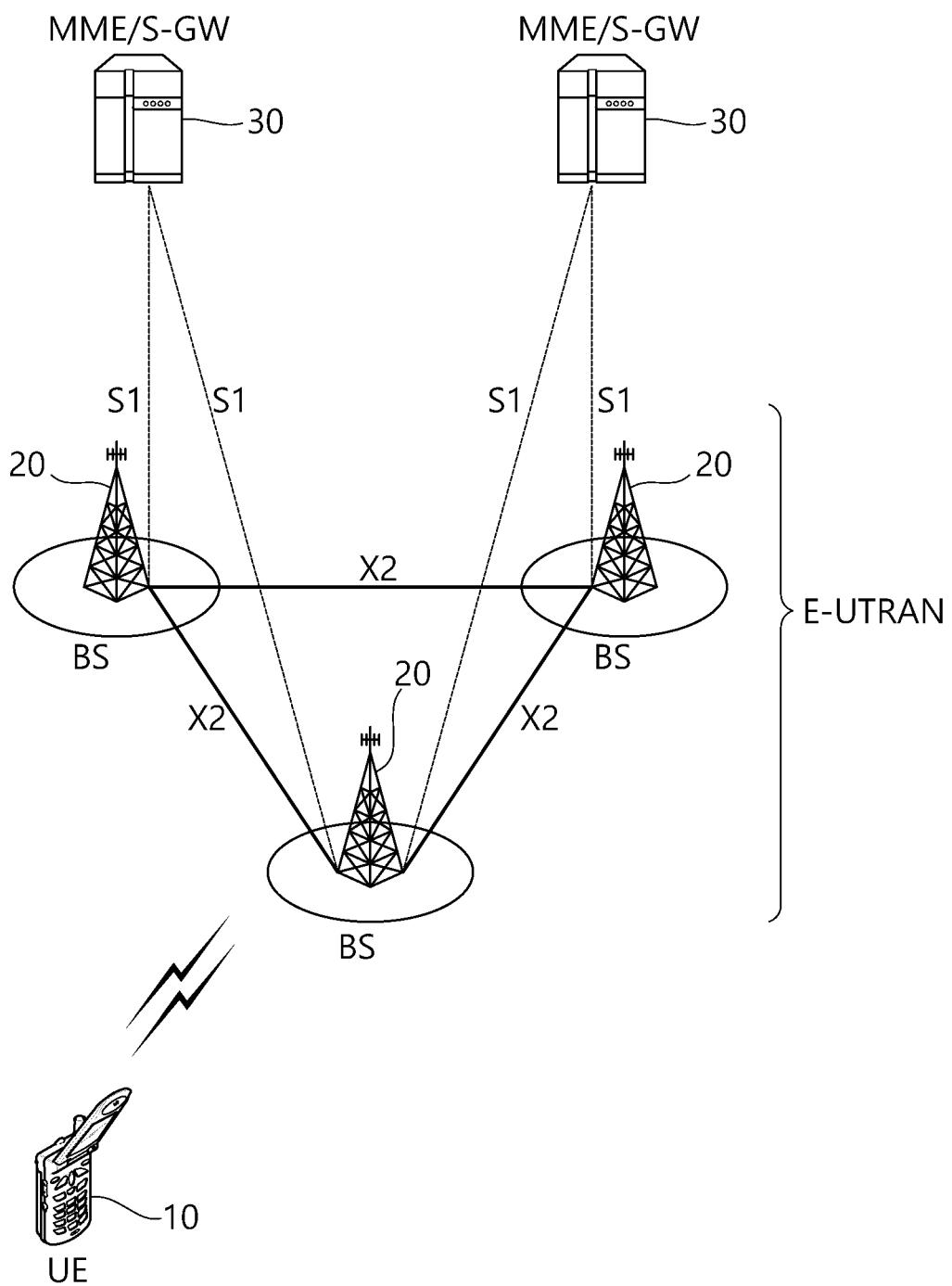
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
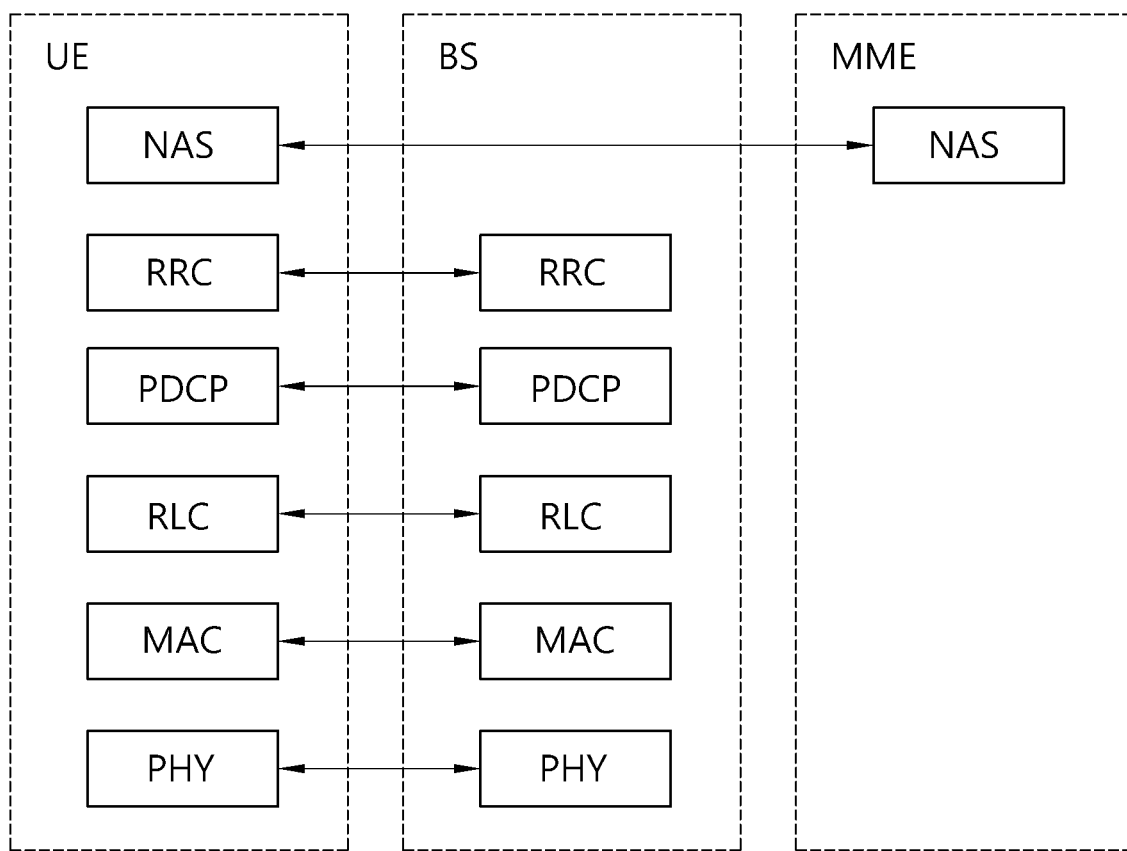
FIG. 2 shows a control plane of a radio interface protocol of an LTE system.
Figure 3:
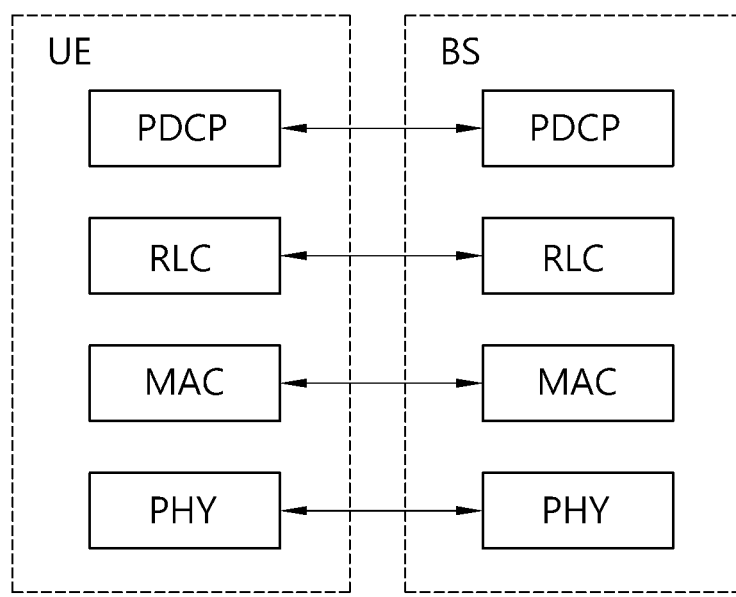
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Figure 4:
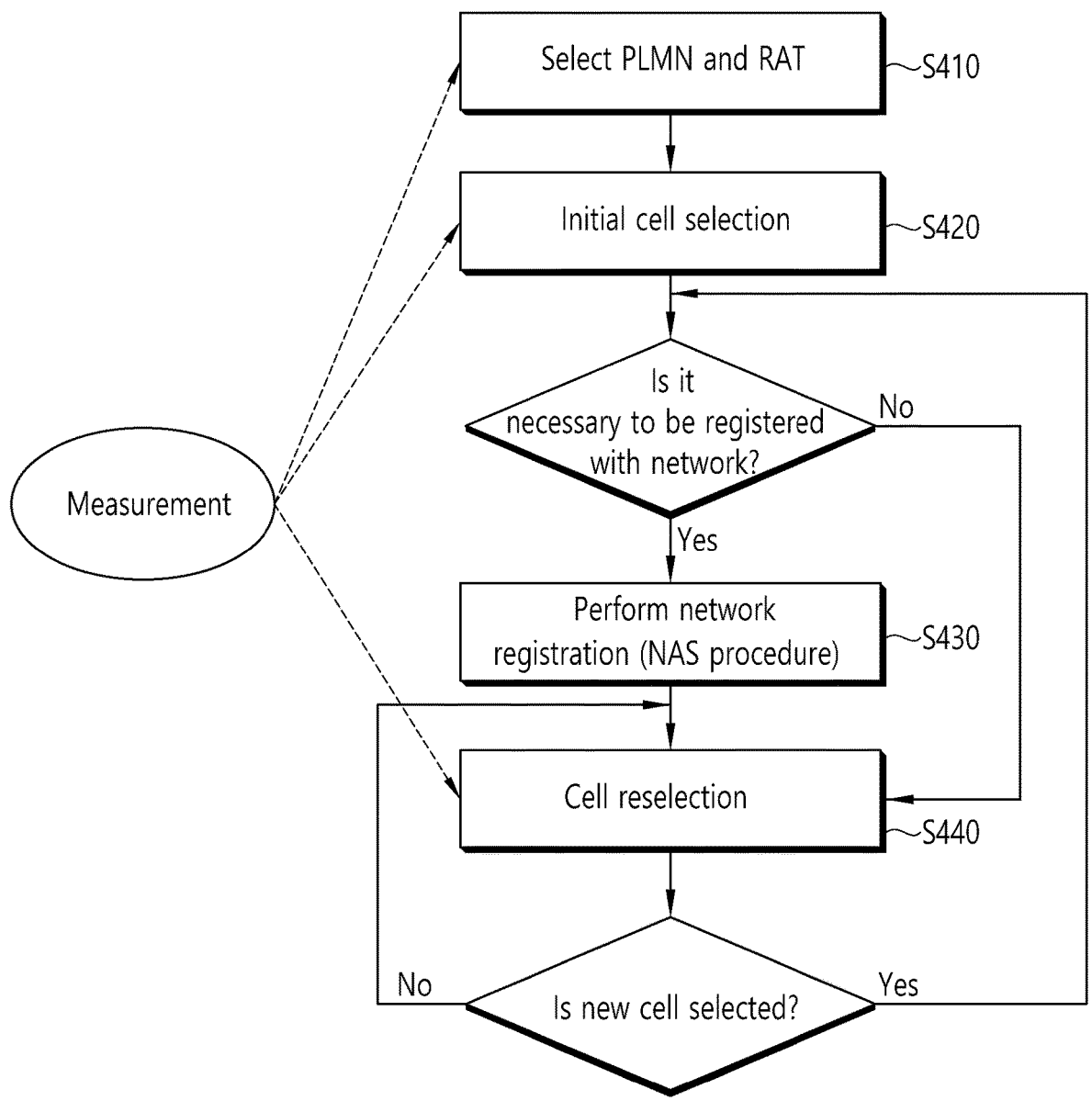
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
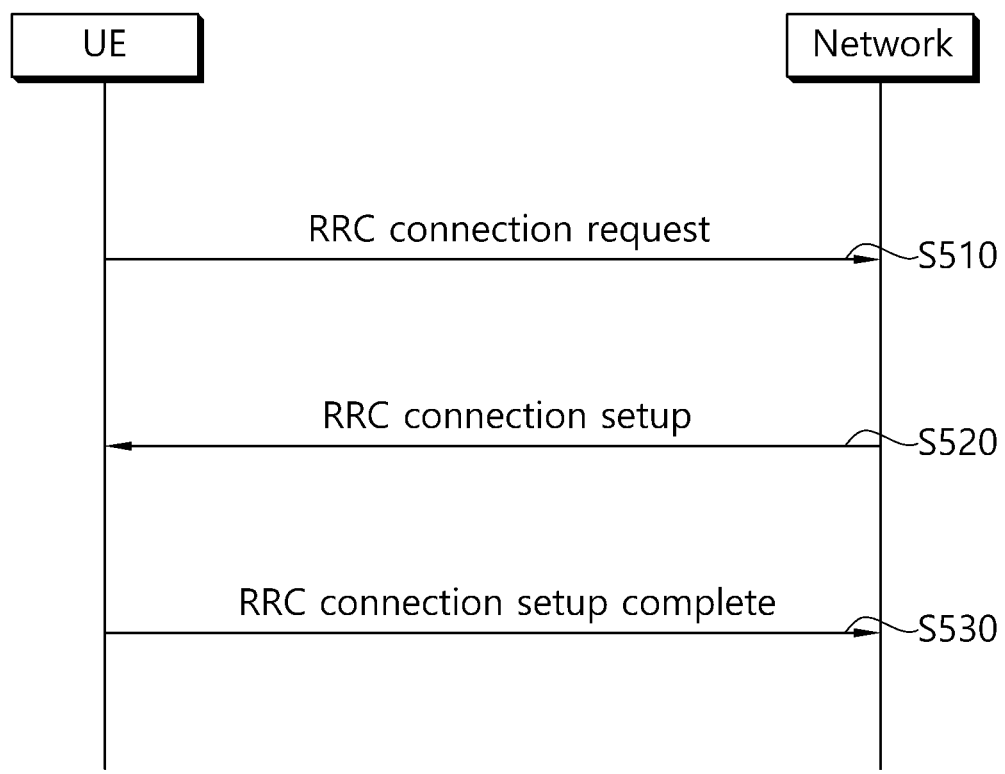
FIG. 5 shows an RRC connection establishment procedure.

FIG. 5 shows an RRC connection establishment procedure.

The UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
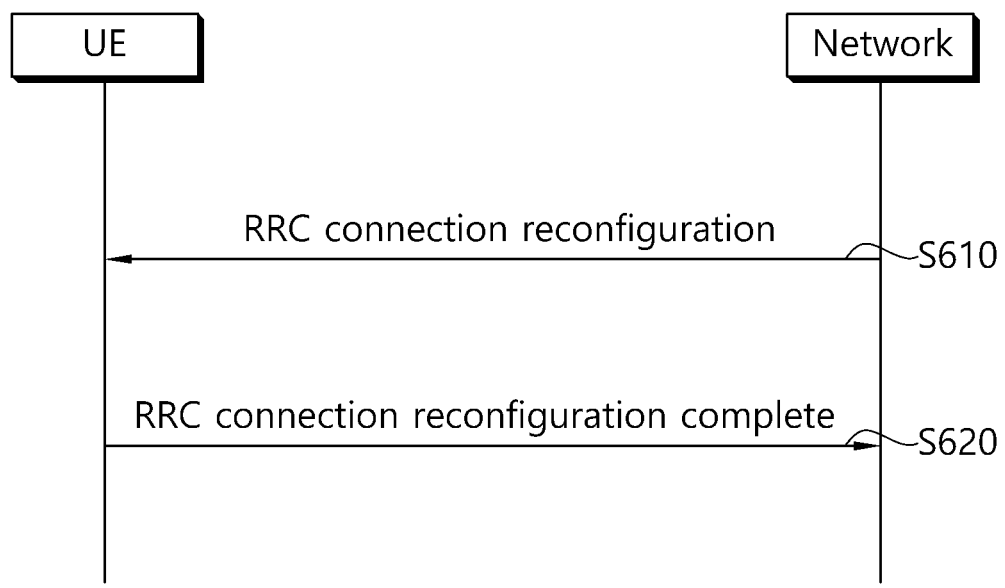
FIG. 6 shows an RRC connection reconfiguration procedure.

FIG. 6 shows an RRC connection reconfiguration procedure.

An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

The following is a detailed description of a procedure of selecting a cell by a UE.

When power is turned-on or the UE is located in a cell, the UE performs procedures for receiving a service by selecting/reselecting a suitable quality cell.

A UE in an RRC idle state should prepare to receive a service through the cell by always selecting a suitable quality cell. For example, a UE where power is turned-on just before should select the suitable quality cell to be registered in a network. If the UE in an RRC connection state enters in an RRC idle state, the UE should selects a cell for stay in the RRC idle state. In this way, a procedure of selecting a cell satisfying a certain condition by the UE in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the UE.

Hereinafter, a method and a procedure of selecting a cell by a UE in a 3GPP LTE is described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each UE set by a network may refer to a dedicated priority. If receiving the dedicated priority, the UE may receive a valid time associated with the dedicated priority together. If receiving the dedicated priority, the UE starts a validity timer set as the received valid time together therewith. While the valid timer is operated, the UE applies the dedicated priority in the RRC idle mode. If the valid timer is expired, the UE discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_S = Q_{meas,s} + Q_{hyst}, \quad R_n = Q_{meas,n} - Q_{offset}$$ [Equation 1]

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Figure 7:
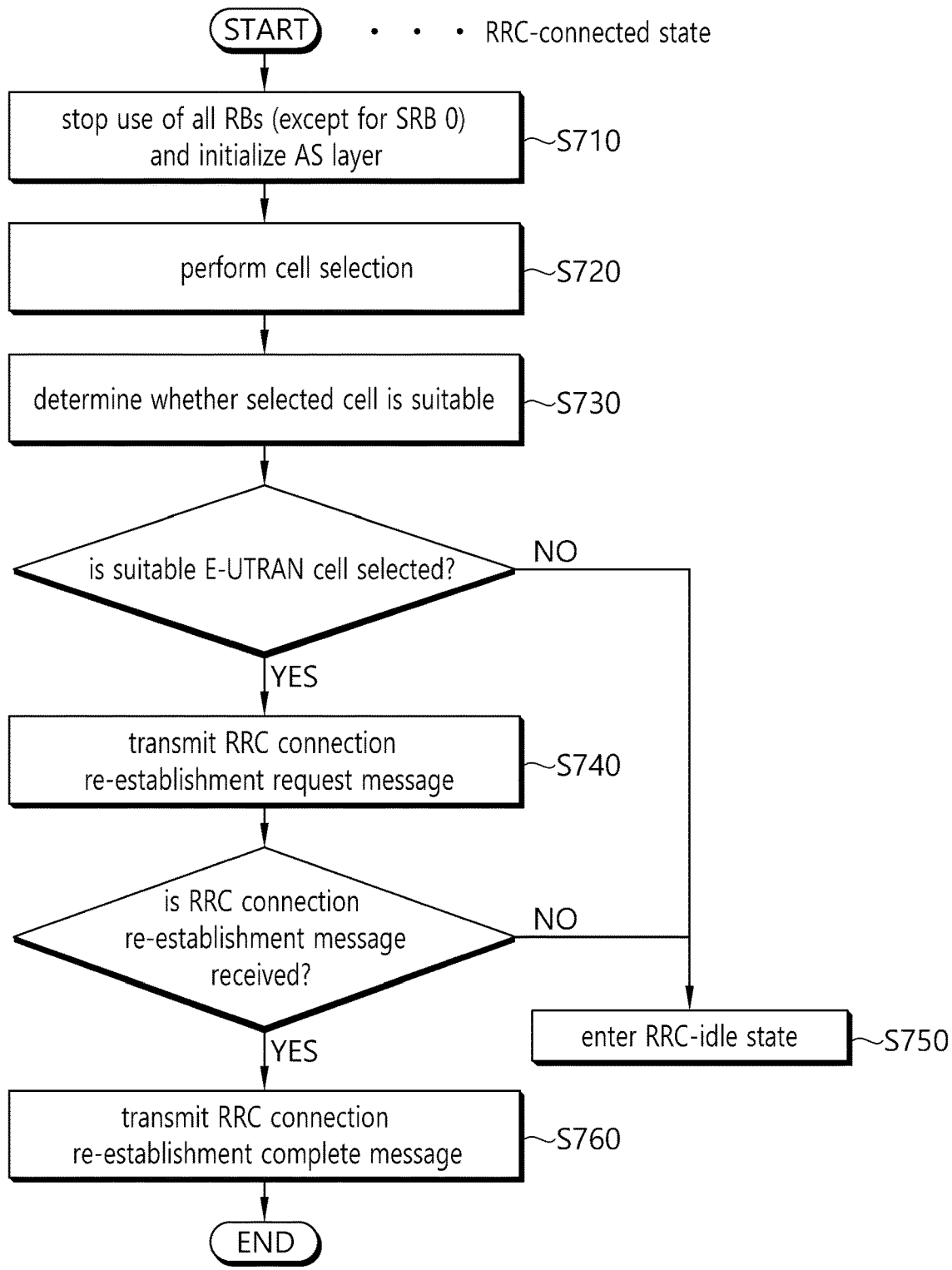
FIG. 7 shows an RRC connection re-establishment procedure.

FIG. 7 shows an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
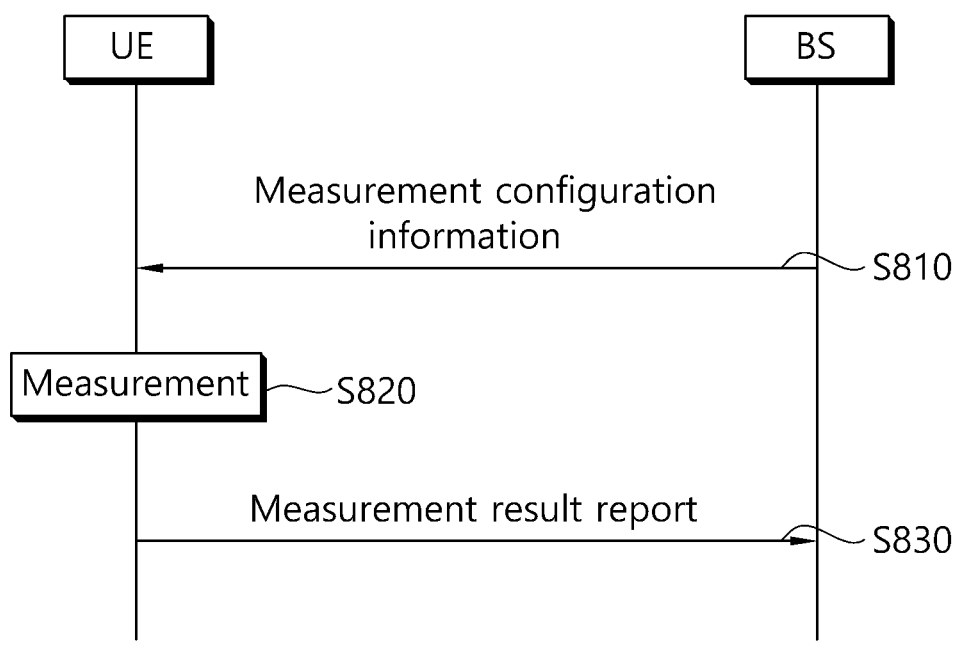
FIG. 8 shows a conventional method of performing measurement.

FIG. 8 shows a conventional method of performing measurement.

A UE receives measurement configuration information from a BS (S810). A message including the measurement configuration information is referred to as a measurement configuration message. The UE performs measurement based on the measurement configuration information (S820). If a measurement result satisfies a reporting condition included in the measurement configuration information, the UE reports the measurement result to the BS (S830). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting are shown in the table 1. If the measurement result of the UE satisfies the determined event, the UE transmits a measurement report message to the BS.

TABLE 1

| Event | Reporting Condition |
| --- | --- |
| Event A1 | Serving becomes better than threshold |
| Event A2 | Serving becomes worse than threshold |
| Event A3 | Neighbour becomes offset better than PCell/PSCell |
| Event A4 | Neighbour becomes better than threshold |
| Event A5 | PCell/PSCell becomes worse than threshold1 and neighbour becomes better than threshold2 |
| Event A6 | Neighbour becomes offset better than SCell |
| Event B1 | Inter RAT neighbour becomes better than threshold |
| Event B2 | PCell becomes worse than threshold1 and inter RAT neighbour becomes better than threshold2 |
| Event C1 | CSI-RS resource becomes better than threshold |
| Event C2 | CSI-RS resource becomes offset better than reference CSI-RS resource |

Figure 9:
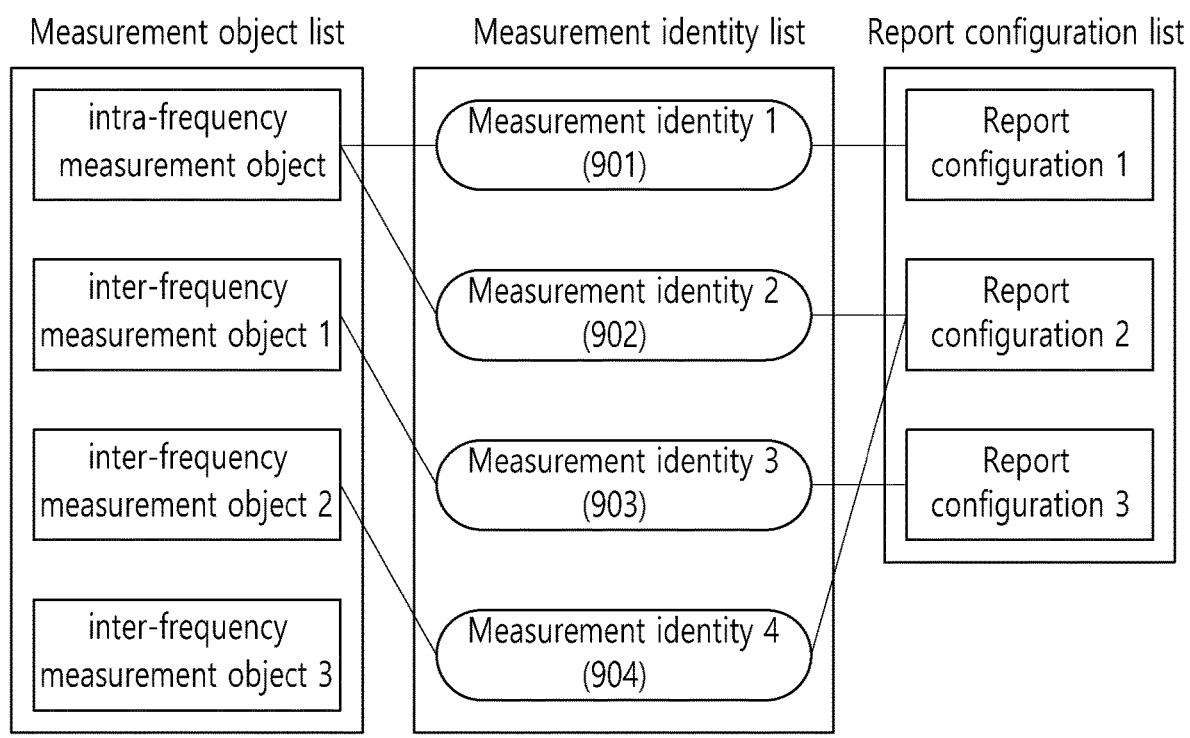
FIG. 9 shows an example of a measurement configuration assigned to a UE.

FIG. 9 shows an example of a measurement configuration assigned to a UE.

First, a measurement identity1 901 associates an intra-frequency measurement object with a reporting configuration 1. The UE performs intra-frequency measurement. The reporting configuration 1 is used to determine a reporting type and a criterion for reporting a measurement result.

A measurement identity2 902 is associated with the intra-frequency measurement object similarly to the measurement identifier1 901, and associates the intra-frequency measurement object with a reporting configuration 2. The UE performs intra-frequency measurement. The reporting configuration 2 is used to determine a reporting format and a criterion for reporting a measurement result.

By using the measurement identity1 901 and the measurement identity2 902, the UE transmits a measurement result even if the measurement result on the intra-frequency measurement object satisfies any one of the reporting configuration 1 and the reporting configuration 2.

A measurement identity3 903 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 904 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 10:
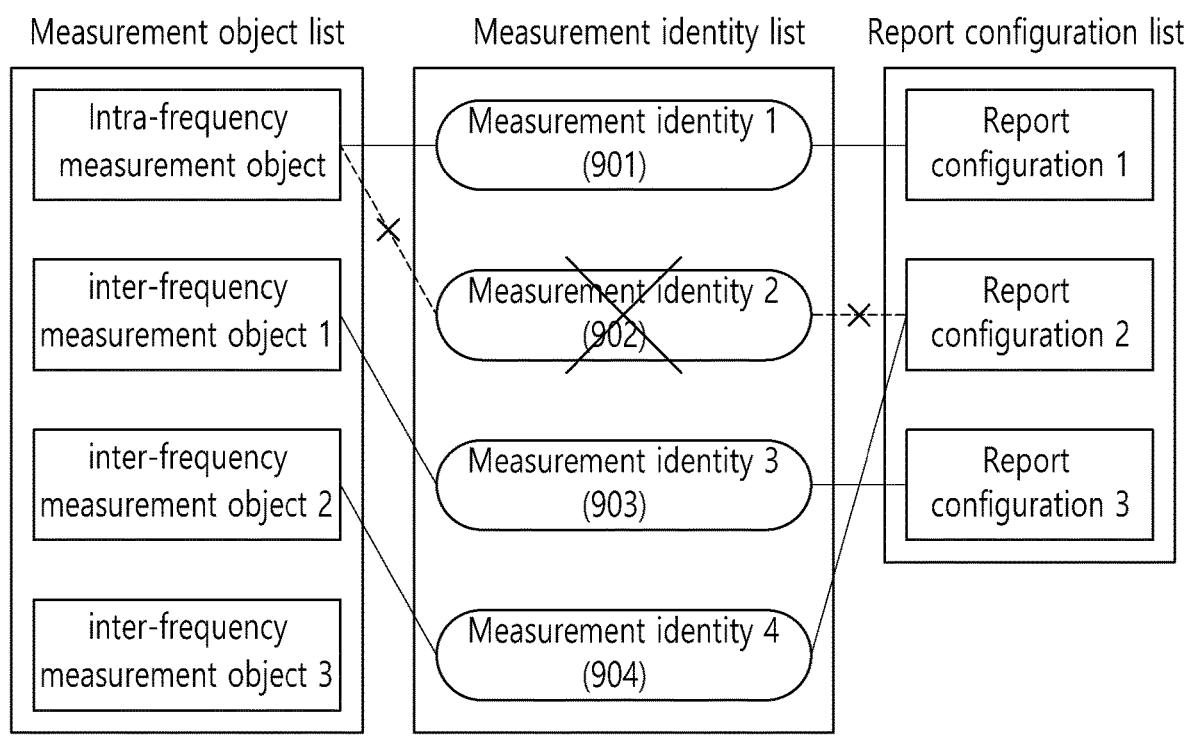
FIG. 10 shows an example of deleting a measurement identity.

FIG. 10 shows an example of deleting a measurement identity. When the measurement identity 2 902 is deleted, measurement for a measurement object associated with the measurement identity 2 902 is stopped and a measurement report is not transported. A measurement object or a reporting configuration associated with the deleted measurement identity may not be changed.

Figure 11:
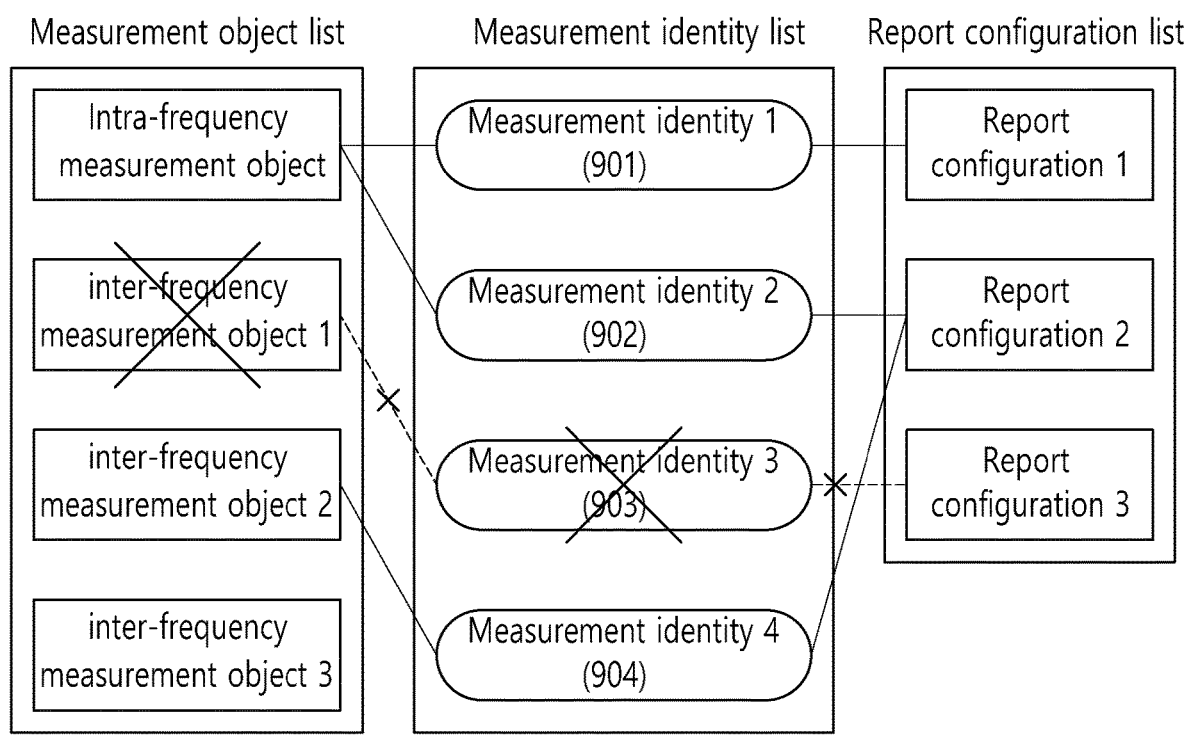
FIG. 11 shows an example of deleting the measurement object.

FIG. 11 shows an example of deleting the measurement object. When the inter-frequency measurement object 1 is deleted, the UE deletes even the measurement identity 3 903 associated therewith. Measurement for the inter-frequency measurement object 1 is stopped and a measurement report is not also transported. However, a reporting configuration associated with the deleted inter-frequency measurement object may not be changed or deleted.

When the reporting configuration is removed, the UE removes even a measurement identity associated therewith. The UE stops measurement for an associated measurement object by the associated measurement identity. However, the measurement object associated with the deleted reporting configuration may not be changed or deleted.

The measurement report may include the measurement identity, a measured quality of the serving cell, and a measurement result of the neighbor cell. The measurement identity identifies a measurement object in which the measurement report is triggered. The measurement result of the neighbor cell may include a cell identity and a measurement quality of the neighbor cell. The measured quality may include at least one of reference signal received power (RSRP) and reference signal received quality (RSRQ).

FIG. 12 illustrates the structure of a wireless local area network (WLAN). FIG. 12(a) illustrates the structure of an infrastructure network of Institute of Electrical and Electronics Engineers (IEEE) 802.11. FIG. 12(b) illustrates an independent BSS.

Referring the FIG. 12(a), a WLAN system may include one or more basic service sets (BSSs) 1200 and 1205. The BSSs 1200 and 1205 are a set of an access point (AP) and a station (STA), such as an AP 1225 and STA1 1200-1, which are successfully synchronized to communicate with each other, and are not a concept indicating a specific region. The BSS 1205 may include one AP 1230 and one or more STAs 1205-1 and 1205-2 that may be connected to the AP 1230.

An infrastructure BSS may include at least one STA, APs 1225 and 1230 providing a distribution service, and a distribution system (DS) 1210 connecting a plurality of APs.

The distribution system 1210 may configure an extended service set (ESS) 1240 by connecting a plurality of BSSs 1200 and 1205. The ESS 1240 may be used as a term indicating one network configured by connecting one or more APs 1225 or 1230 through the distribution system 1210. APs included in one ESS 1240 may have the same service set identification (SSID).

A portal 1220 may serve as a bridge that connects the WLAN (IEEE 802.11) and another network (for example, 802.X).

In the infrastructure network illustrated in the FIG. 12(a), a network between the APs 1225 and 1230 and a network between the APs 1225 and 1230 and the STAs 1200-1, 1205-1, and 1205-2 may be configured. However, it is possible to configure a network between STAs in the absence of the APs 1225 and 1230 to perform communication. A network configured between STAs in the absence of the APs 1225 and 1230 to perform communication is defined as an ad hoc network or independent basic service set (BSS).

Referring to FIG. 12(b), an independent BSS (IBSS) is a BSS that operates in an ad hoc mode. The IBSS includes no AP and thus has no centralized management entity that performs a management function at the center. That is, in the IBSS, STAs 1250-1, 1250-2, 1250-3, 1255-4, and 1255-5 are managed in a distributed manner. In the IBSS, all STAs 1250-1, 1250-2, 1250-3, 1255-4, and 1255-5 may be mobile STAs. Further, the STAs are not allowed to access the DS and thus establish a self-contained network.

An STA is a functional medium including medium access control (MAC) and a physical layer interface for a radio medium according to IEEE 802.11 specifications and may be used to broadly mean both an AP and a non-AP STA.

An STA may also be referred to as various names, such as a mobile terminal, a wireless device, a wireless transmit/receive unit (WTRU), user equipment (UE), a mobile station (MS), a mobile subscriber unit, or simply a user.

Hereinafter, interworking between a 3GPP access network and other access network will be described.

A 3GPP introduces interworking with a non-3GPP access network (e.g. WLAN) from Rel-8 to find accessible access network, and regulates ANDSF (Access Network Discovery and Selection Functions) for selection. An ANDSF transfers accessible access network finding information (e.g. WLAN, WiMAX location information and the like), Inter-System Mobility Policies (ISMP) capable of reflecting policies of a business, and an Inter-System Routing Policy (ISRP). The UE may determine whether to transmit certain IP traffic through a certain access network. An ISMP may include a network selection rule with respect to selection of one active access network connection (e.g., WLAN or 3GPP) by the UE. An ISRP may include a network selection rule with respect to selection of at least one potential active access network connection (e.g., both of WLAN and 3GPP) by the UE. The ISRP includes Multiple Access PDN Connectivity (MAPCON), IP Flow Mobility (IFOM), and non-seamless WLAN offloading. For dynamic provision between the ANDSF and the UE, Open Mobile Alliance Device Management (OMA DM) or the like are used.

The MAPCON simultaneously configures and maintains a plurality of packet data networks (multiple PDN connectivity) through a 3GPP access network and a non-3GPP access network and regulates a technology capable of performing seamless traffic offloading in the whole active PDN connection unit. To this end, an ANDSF server provides APN (Access Point Name) information to perform offloading, inter-access network priority (routing rule), Time of Day to which offloading method is applied, and access network (Validity Area) information to be offloaded.

The IFOM supports mobility and seamless offloading of an IP flow unit of flexible subdivided unit as compared with the MAPCON. A technical characteristic of the IFOM allows a UE to access through different access network when the UE is connected to a packet data network using an access point name (APN). Mobility and a unit of offloading may be moved in a specific service IP traffic flow unit which is not a packet data network (PDN), the technical characteristic of the IFOM has flexibility of providing a service. To this end, an ANDSF server provides IP flow information to perform offloading, priority (routing rule) between access networks, Time of Day to which an offloading method is applied, and Validity Area where offloading is performed.

The non-seamless WLAN offloading refers to a technology which changes a certain path of a specific IP traffic to a WLAN and completely offloads traffic without passing through an EPC. Since the non-seamless WLAN offloading is not anchored in P-GW for supporting mobility, offloaded IP traffic may not continuously moved to a 3GPP access network. To this end, the ANDSF server provides information similar to information to be provided for performing an IFOM.

Figure 13:
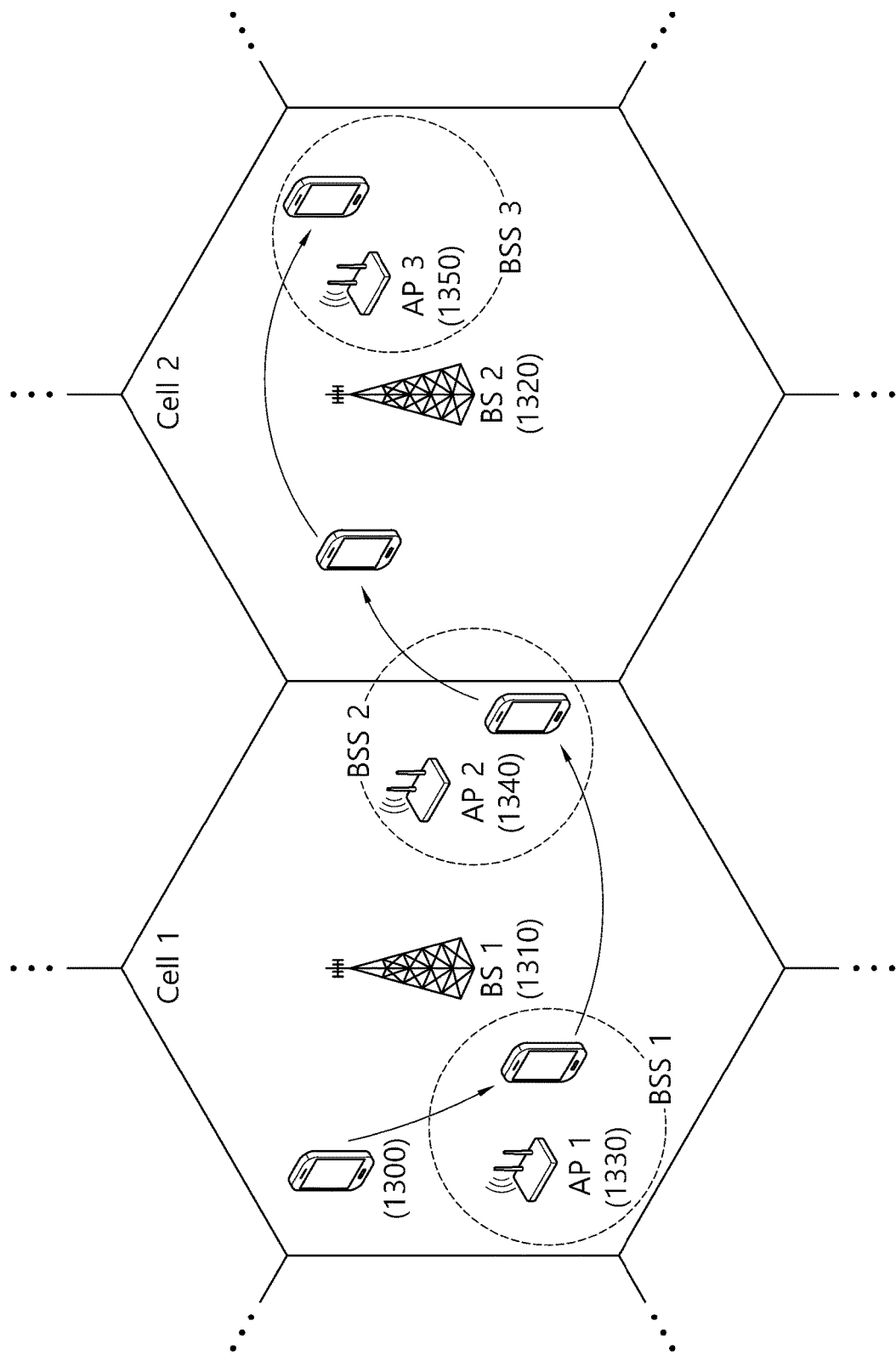
FIG. 13 shows an example of an environment where a 3GPP access network and a WLAN access network coexist.

FIG. 13 shows an example of an environment where a 3GPP access network and a WLAN access network coexist.

Referring to FIG. 13, a cell 1 centering a base station 1 (1310) and a cell 2 centering a base station 2 (1320) are deployed as a 3GPP access network. Further, a Basic Service Set (BSS) 1 as the WLAN access network centering an Access Point (AP) 1 (1330) located in a cell 1 and a BSS2 centering AP2 (1340) and deployed. A BSS3 centering a AP3 (1350) located in a cell 2 is deployed. Coverage of the cell is shown with a solid line, and coverage of BSS is shown with a dotted line.

It is assumed that the UE 1300 is configured to perform communication through a 3GPP access network and a WLAN access network. In this case, the UE 1300 may refer to a station.

First, the UE 1300 may establish connection with a BS1 (1310) in a cell 1 to perform traffic through a 3GPP access network.

The UE 1300 may enters coverage of BSS1 while moving into coverage of cell 1. In this case, the UE 1300 may connect with a WLAN access network by performing association and authentication procedures with an AP1 (1330) of BSS1. Accordingly, the UE 1300 may process traffic through a 3GPP access network and a WLAN access network. Meanwhile, the UE 1300 moves and is separated from the coverage BSS1, connection with a WLAN access network may be terminated.

The UE 1300 continuously move into the coverage of cell 1 and move around a boundary between cell 1 and cell 2, and enters coverage of BSS2 to find BSS2 through scanning. In this case, the UE 1300 may connect with the WLAN access network by performing association and authentication procedures of AP2 (1340) of the BSS2. Meanwhile, since the UE 1300 in the coverage of the BSS2 is located at a boundary between the cell 1 and the cell 2, service quality through the 3GPP access network may not be excellent. In this case, the UE 1300 may operate to mainly process traffic through a WLAN access network.

When the UE 1300 moves and is separated from the coverage of the BSS2 and enters a center of the cell 2, the UE 1300 may terminate connection with the WLAN access network and may process traffic through a 3GPP access network based on the cell 2.

The UE 1300 may enter coverage of the BSS3 while moving into the coverage of cell 2 to find the BSS1 through scanning. In this case, the UE 1300 may connect with the WLAN access network by association and authentication procedures of an AP3 (1350) of the BSS3. Accordingly, the UE 1300 may process the traffic through the 3GPP access network and the WLAN access network.

As illustrated in an example of FIG. 13, in a wireless communication environment where a 3GPP access network and a non-3GPP access network coexist, the UE may adaptively process traffic through a 3GPP access network and/or a non-3GPP access network.

As policies for interworking between the 3GPP access network and a non-3GPP access network, the above ANDSF may be configured. If the ANDSF is configured, the UE may process traffic of the 3GPP access network through a non-3GPP access network or a 3GPP access network.

Meanwhile, interworking policies except for the ANDSF may be configured. In order to easily use the WLAN except for ANDSF in a current 3GPP network, interworking policies reflecting measurement parameters such as load and signal quality of the 3GPP access and/or the WLAN access network are defined. Hereinafter, the policy refers to an RAN policy. Further, a traffic steering rule according to an RAN policy refers to an RAN rule.

The RAN rule may be provided to the UE together with at least one RAN rule parameter for evaluating traffic steering according to the RAN rule. The RAN rule and the RAN rule parameter may be configured as follows.

1. The RAN rule may indicate whether traffic steering to a WLAN is allowed.

2. The RAN rule may indicate a traffic steering estimation condition being a condition allowed or required by traffic steering performing to the WLAN access network from the 3GPP access network. The condition according to the RAN rule may involve estimation of measurement results with respect to an LTE cell. Further, the condition according to the RAN rule may involve estimation of measurement results with respect to the WLAN. The estimation may be comparison of the measurement result with an RAN rule parameter (e.g., a measurement threshold value and the like) indicated in the traffic steering information. The following illustrates an example of a traffic steering estimation condition considered by the UE.

(1) Traffic Steering Condition to a WLAN Access Network

RSRP measurement value (measured_RSRP)<low RSRP threshold value (Threshold_RSRP_low)

3GPP load measurement value (measured_3GPPLoad)> high 3GPP load threshold value (Threshold_3GPP-Load_High)

WLAN load measurement value (measured_WLAN-Load)<low WLAN load threshold value (Threshold_WLANLoad_low)

WLAN signal strength measurement value (measured_WLANsignal)>high WLAN signal strength threshold value (Threshold_WLANsignal_high)

(2) Traffic Steering Condition to 3GPP Access Network

RSRP measurement value (measured_RSRP)>high RSRP threshold value (Threshold_RSRP-high)

3GPP load measurement value (measured_3GPPLoad)< low 3GPP load threshold value (Threshold_3GPP-Load_High)

WLAN load measurement value (measured_WLAN-Load)>high WLAN load threshold value (Threshold_WLANLoad_high)

WLAN signal strength measurement value (measured_WLANsignal)<low WLAN signal strength threshold value (Threshold_WLANsignal_low)

Meanwhile, the estimation condition may be configured while the at least one condition is coupled with each other using and/or. For example, the traffic steering estimation condition implemented by coupling the at least one condition may be implemented as follows.

Traffic steering estimation condition for traffic steering to WLAN:

(measured_RSRP<Threshold_RSRP_low) and
(measured_WLANLoad<Threshold_WLANLoad_low) and
(measured_WLANsignal>Threshold_WLANsignal_high)

Traffic steering estimation condition for traffic steering to 3GPP:

(measured_RSRP>Threshold_RSRP_low) or
(measured_WLANLoad>Threshold_WLANLoad_high) or
(measured_WLANsignal<Threshold_WLANsignal_low)

3. The RAN rule may indicate a condition where traffic steering performing to a 3GPP access network from the WLAN access network is allowed or required.

4. The RAN rule may indicate an object WLAN access network where performing the traffic steering from the 3GPP access network is allowed or required.

5. The RAN rule may indicate traffic in which routing is allowed to the WLAN access network. Alternatively, the RAN rule may indicate at least one traffic where routing to the WLAN access network is allowed, that is, which may be served by the 3GPP access network.

Meanwhile, the ANDSF configured in the UE may include a legacy ANDSF and/or an enhanced ANDSF.

The legacy ANDSF may be defined as an ANDSF which does not include ANDSF management object (MO) such as corresponding parameters defined in the RAN rule parameter. Unlike the legacy ANDSF, the enhanced ANDSF may be defined as an ANDSF including an ANDSF MO such as corresponding parameters defined in a RAN rule parameter.

Figure 14:
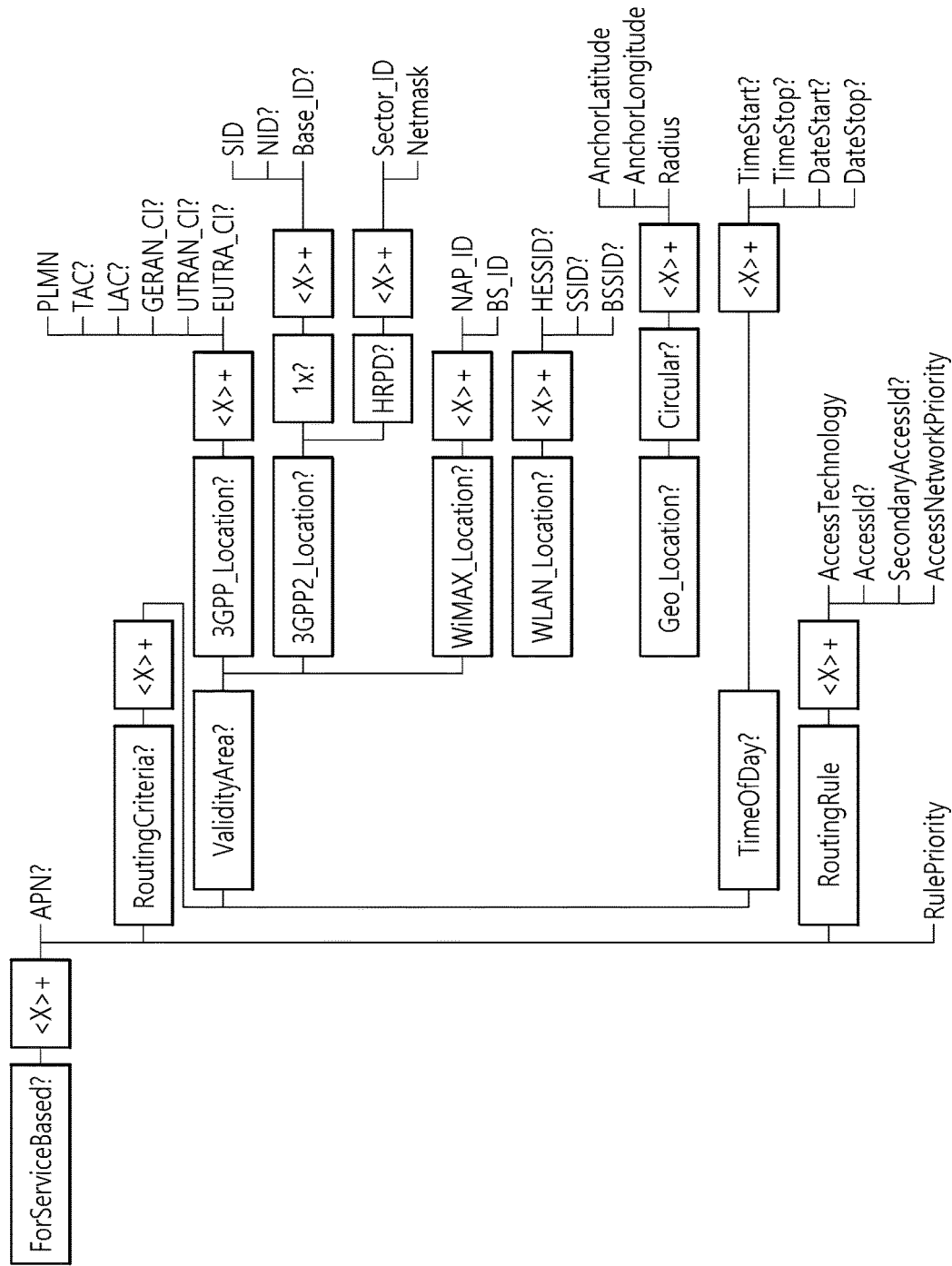
FIG. 14 shows an example of a legacy ANDSF with respect to an MAPCON.
Figure 15:
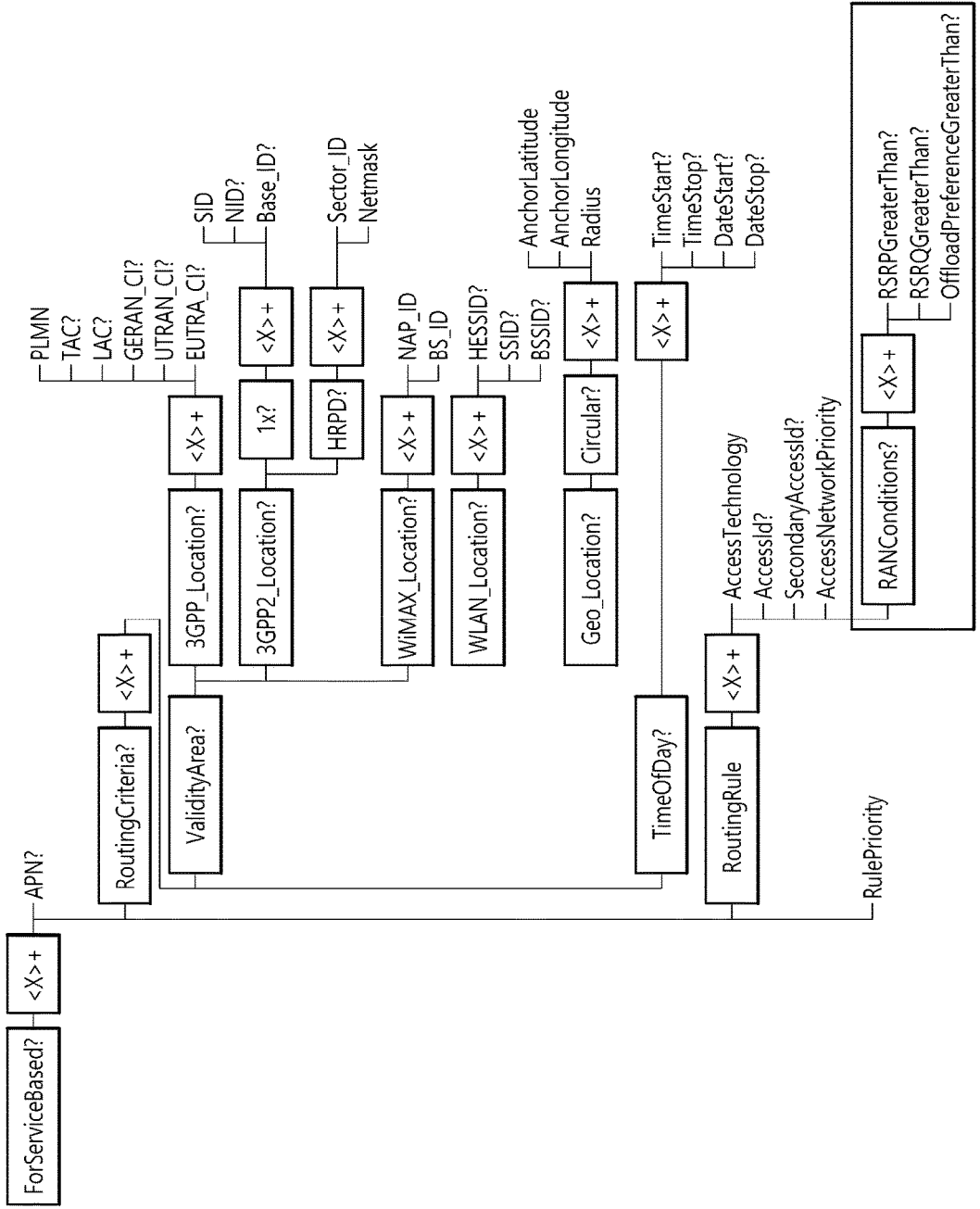
FIG. 15 shows an example of an enhanced ANDSF with respect to the MAPCON.

FIG. 14 shows an example of a legacy ANDSF with respect to an MAPCON, and FIG. 15 shows an example of an enhanced ANDSF with respect to the MAPCON.

Referring to FIG. 14, the legacy ANDSF does not include an RAN rule parameter such as RSRP and a WLAN signal level as an ANDSF MO.

Meanwhile, referring to FIG. 15, the enhanced ANDSF may include RSRP, RSRQ, and an offload preference as the ANDSF MO. Further, the ANDSF may include a WLAN signal level (e.g. RSSI, RSCP), a WLAN load level, a WLAN backhaul data rate, and a WLAN backhaul load.

The enhanced ANDSF may specify the traffic steering evaluation condition associated with each ANDSF MO. The traffic steering evaluation condition specified by the enhanced ANDSF may be configured similar to the traffic steering evaluation condition associated with the configured RAN rule parameter configured by the RAN rule. A detailed description thereof will be omitted.

An Rel-12 WLAN AP and an Rel-13 WLAN AP can be deployed together around a UE. In the present invention, the Rel-12 WLAN AP may refer to a WLAN AP supporting UE-based traffic steering, and the Rel-13 WLAN AP may refer to a WLAN AP supporting network-based RAN/WLAN aggregation. UE-based traffic steering may mean that a UE autonomously performs traffic steering based on the RAN rule or the ANDSF. Network-based RAN/WLAN aggregation may mean that a network autonomously controls traffic by transmitting an RAN/WLAN aggregation command.

For example, suppose that an Rel-12 WLAN AP and an Rel-13 WLAN AP are deployed together around a UE and the UE supports both UE-based traffic steering in Rel-12 and RAN/WLAN aggregation in Rel-13. The UE may receive an RAN/WLAN aggregation start command from the network even though the UE has steered some traffic to the WLAN AP through the Rel-12 UE-based traffic steering. However, since the UE can be connected to only one WLAN AP, the UE cannot execute the RAN/WLAN aggregation start command even if receiving the RAN/WLAN aggregation start command. In addition, traffic controlled by the network according to the Rel-13 RAN/WLAN aggregation start command may be readjusted by UE-based traffic steering. The present invention proposes a method for solving the foregoing problems and a device supporting the same.

Hereinafter, a method for activating/deactivating, by a UE, UE-based traffic steering according to one embodiment of the present invention will be described.

1. Report of RAN/WLAN Interworking State (1) When a UE autonomously steers some traffic to a WLAN through UE-based traffic steering and still transmits/receives data through the WLAN, the UE may transmit WLAN offloading information to the network. The WLAN offloading information may be information indicating an RAN/WLAN interworking state to the network. UE-based traffic steering may be traffic steering based on the RAN rule or ANDSF. The RAN rule may be broadcast through SIB 17 or a UE-specific message.

(2) The WLAN offloading information may include the following information.

Serving AP information: Service Set Identifier (SSID), Basic Service Set Identifier (BSSID), Homogeneous Extended Service Set Identifier (HESSID), domain name list, operating class, and/or channel number APN/PDN steered to the WLAN according to the RAN rule or ANDSF Radio bearer or EPS bearer to be steered to the WLAN according to the RAN rule or ANDSF APN/PDN/radio bearer or EPS bearer that can be offloaded to the WLAN Data amount: The amount of data transmitted and/or received during a predefined period of time or the amount of data stored in a buffer QoS information on ongoing traffic in the WLAN (the Qos information includes at least one of Packet Delay Budget (PDB: the upper bound of delay time allowable for the UE), Packet Error Loss Rate (PELR), and an access category (that is, voice, video, best effort, and background))

(3) If at least one of the following conditions is satisfied, the UE may transmit the WLAN offloading information to the network.

After the UE initiates an RRC connection establishment procedure (for example, when the UE transmits an RRC connection establishment complete message)

After the UE has successfully completed the RRC connection establishment procedure After the UE receives a WLAN offloading information request from the network After the UE receives an RAN/WLAN aggregation command When the WLAN offloading information is changed (for example, when some traffic needs to be steered from the WLAN and/or to the WLAN according to the RAN rule or ANDSF or when the UE is disconnected from the WLAN)

When an event report condition for WLAN measurement is satisfied (when the event report condition for WLAN measurement is satisfied, the WLAN offloading information may be included in a WLAN measurement report message or the UE may transmit the WLAN offloading information to the network after a WLAN measurement report message is transmitted to the network)

(4) Upon receiving the WLAN offloading information from the UE, the network may issue a traffic steering activation command or a traffic steering deactivation command, thereby explicitly allowing or prohibiting UE-based traffic steering.

Alternatively, upon receiving the WLAN offloading information from the UE, the network may issue an RAN/WLAN aggregation start command, thereby implicitly prohibiting UE-based traffic steering. The explicit or implicit commands from the network are specified in the following steps.

2-A. Reception of Traffic Steering Activation/Deactivation Commands (1) The network may transmit a traffic steering deactivation message to the UE. The traffic steering deactivation message may be a message for prohibiting UE-based traffic steering. Upon receiving the traffic steering deactivation message, the UE may not apply the RAN rule or ANDSF broadcast from the serving cell so as not to autonomously perform traffic steering to the WLAN/from the WLAN. The UE may be a UE supporting RAN/WLAN aggregation specified in Rel-13, which may mean that the UE performs traffic steering to the WLAN/from the WLAN only when the UE receives a traffic steering command from the network.

Further, upon receiving the traffic steering deactivation message, the UE may steer all traffic of the WLAN to the RAN. Accordingly, the network may recognize all data to be offloaded.

(2) The network may transmit a traffic steering activation message to the UE. The traffic steering activation message may be a message for allowing UE-based traffic steering. Upon receiving the traffic steering activation message, the UE may autonomously continue traffic steering to the WLAN/from the WLAN.

(3) The traffic steering deactivation message and the traffic steering activation message may be dedicated to the UE (that is, UE-specific messages) or may be common to a plurality of UEs in a cell (that is, cell-specific messages).

2-B. Reception of RAN/WLAN Aggregation Command (1) The network may transmit an RAN/WLAN aggregation start command to the UE. The RAN/WLAN aggregation start command may be supported by an Rel-13 UE. The RAN/WLAN aggregation start command may be an instruction to prohibit UE-based traffic steering. Here, upon receiving the RAN/WLAN aggregation start command, the UE may activate UE-based traffic steering depending on the presence of ongoing traffic in the WLAN.

(2) After the RAN/WLAN aggregation start command is applied, if the transmission/reception of some traffic is ongoing in the WLAN, the UE may autonomously deactivate UE-based traffic steering. Alternatively, after the RAN/WLAN aggregation command is applied, if the transmission/reception of some traffic is ongoing in the WLAN, the UE may transmit the WLAN offloading information to the network such that the network deactivate UE-based traffic steering. That is, after the RAN/WLAN aggregation command is applied, if the transmission/reception of some traffic is ongoing in the WLAN, UE-based traffic steering may be prohibited. UE-based traffic steering may be traffic steering based on the RAN rule or ANDSF. Prohibited UE-based traffic steering may be resumed when the network transmits an RAN/WLAN aggregation stop command to the UE.

(3) After the RAN/WLAN aggregation start command is applied, if no transmission/reception of traffic is ongoing in the WLAN, the UE may autonomously activate UE-based traffic steering.

(4) Upon receiving the RAN/WLAN aggregation start command, the UE may steer all traffic of the WLAN to the RAN. Then, the UE may transmit the WLAN offloading information to the network without serving AP information.

(5) Step 2-B may be performed only when the UE cannot support both the RAN rule/ANDSF and RAN/WLAN aggregation at the same time. Step 2-B may be performed by the UE communicating with the WLAN AP according to the RAN rule or ANDSF only when the network has established the aggregation of the AP and LTE through the RAN/WLAN aggregation start command. Preferably, even if UE-based traffic steering is deactivated, the UE may perform traffic steering via LTE according to the RAN rule or ANDSF.

Figure 16:
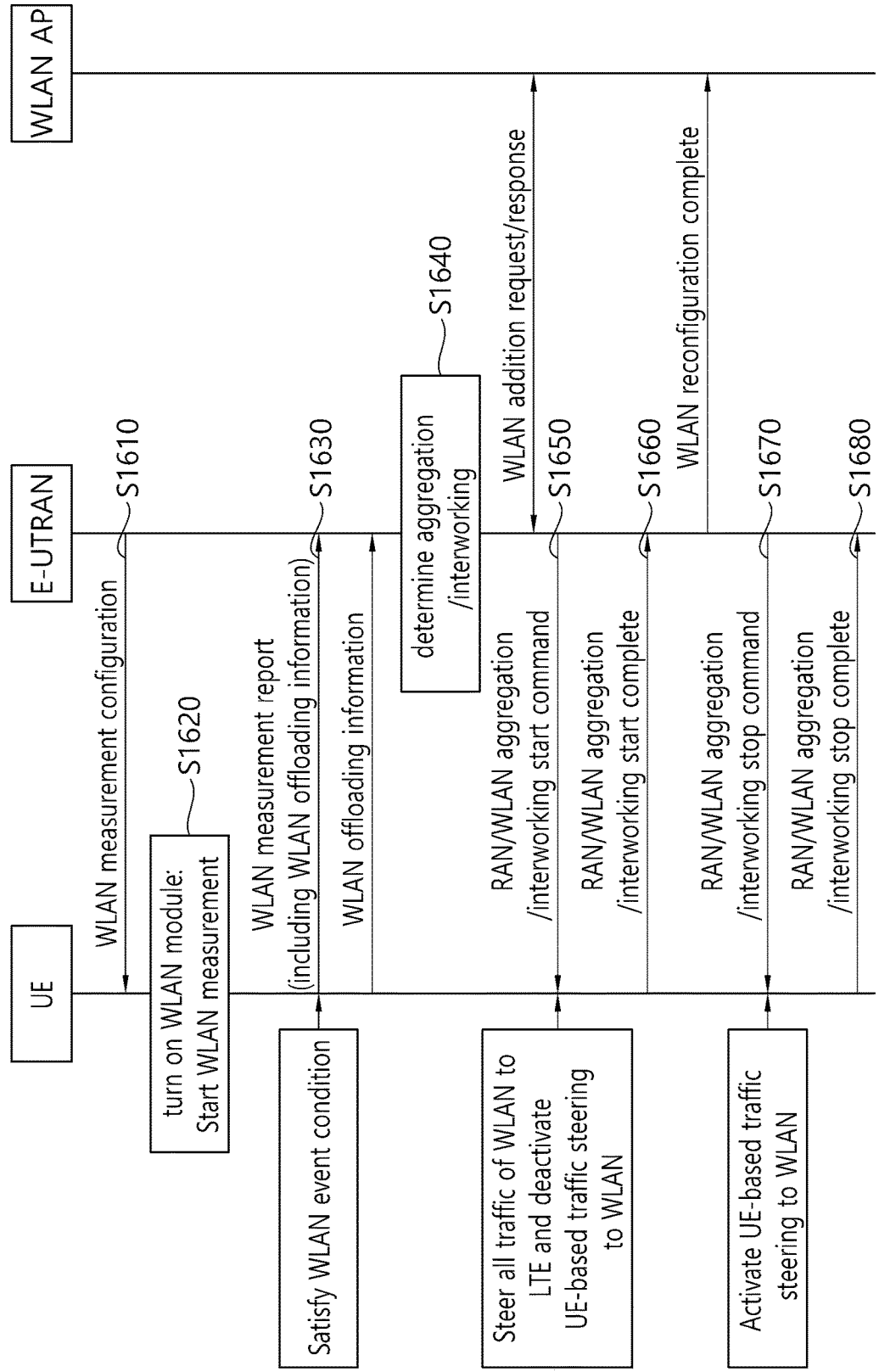
FIG. 16 is a method for activating/deactivating UE-based traffic steering according to one embodiment of the present invention.

FIG. 16 is a method for activating/deactivating UE-based traffic steering according to one embodiment of the present invention.

Referring to FIG. 16, a UE may receive a WLAN measurement configuration from a network (S1610).

Upon receiving the measurement configuration, the UE may perform WLAN measurement (S1620).

When a WLAN measurement report event condition is satisfied, the UE may transmit a WLAN measurement report to the network (S1630). The WLAN measurement report may include WLAN offloading information. Alternatively, after transmitting the WLAN measurement report to the network, the UE may transmit the WLAN offloading information. The WLAN offloading information may be information indicating an RAN/WLAN interworking state.

The embodiment of FIG. 16 shows that the WLAN offloading information is transmitted when the WLAN measurement report event condition is satisfied. However, the WLAN offloading information may be transmitted under various conditions. For example, the WLAN offloading information may be transmitted after the UE initiates an RRC connection establishment procedure. In another example, the WLAN offloading information may be transmitted after the UE receives an RAN/WLAN aggregation command.

The WLAN offloading information may include serving AP information, APN/PDN information steered according to the RAN rule or ANDSF, the amount of data, and the like. The network may determine whether to perform or stop UE-based traffic steering based on the WLAN offloading information.

The network may determine to perform RAN/WLAN aggregation/interworking (S1640).

The UE may receive an RAN/WLAN aggregation/interworking start command from the network (S1650). Upon receiving the RAN/WLAN aggregation/interworking start command, the UE may steer all traffic of the WLAN to LTE and may deactivate UE-based traffic steering. That is, the UE may no longer perform traffic steering based on the RAN rule or ANDSF.

The UE may transmit an RAN/WLAN aggregation/interworking start complete message to the network (S1660). Then, the network may transmit a WLAN reconfiguration complete message to the WLAN AP.

The UE may receive an RAN/WLAN aggregation/interworking stop command from the network (S1670). Upon receiving the RAN/WLAN aggregation/interworking stop command, the UE may activate UE-based traffic steering.

The UE may transmit an RAN/WLAN aggregation/interworking stop complete message to the network (S1680).

In the present specification, RAN/WLAN aggregation/interworking may be used to indicate the same concept as RAN/WLAN aggregation.

According to the embodiment of FIG. 16, the network determines whether to allow the UE to perform UE-based traffic steering or to prohibit the UE from performing UE-based traffic steering, thereby solving the problem that the UE redundantly performs UE-based traffic steering even though performing RAN/WLAN aggregation specified in Rel-13.

Figure 17:
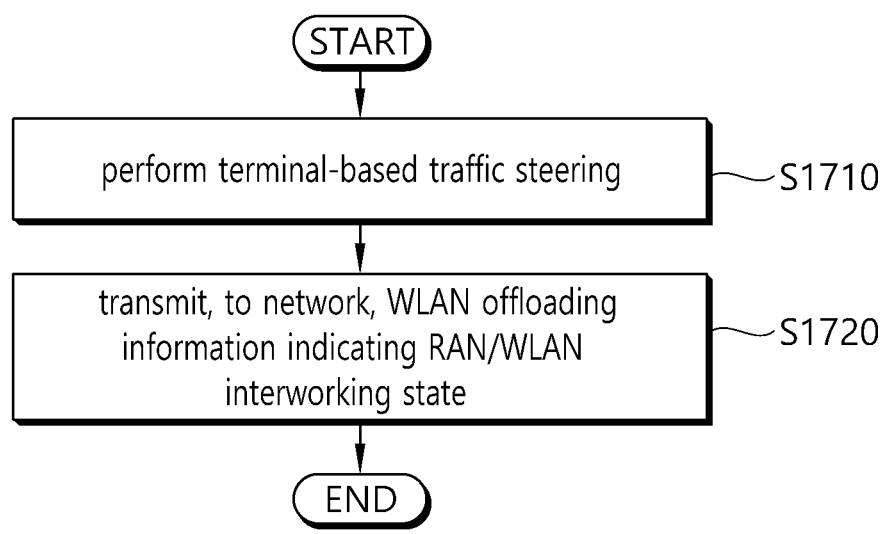
FIG. 17 is a block diagram illustrating a method for activating/deactivating UE-based traffic steering according to one embodiment of the present invention.

FIG. 17 is a block diagram illustrating a method for activating/deactivating UE-based traffic steering according to one embodiment of the present invention.

Referring to FIG. 17, a UE may perform UE-based traffic steering (S1710). UE-based traffic steering may be traffic steering based on the RAN rule or ANDSF.

The UE may transmit WLAN offloading information indicating an RAN/WLAN interworking state to a network (S1720).

The WLAN offloading information may include serving AP information. The WLAN offloading information may include APN information steered to the WLAN. The WLAN offloading information may include PDN information steered to the WLAN. The WLAN offloading information may include radio bearer information to be steered to the WLAN. The WLAN offloading information may include EPS bearer information to be steered to the WLAN. The WLAN offloading information may include APN information that may be offloaded to the WLAN. The WLAN offloading information may include PDN information that may be offloaded to the WLAN. The WLAN offloading information may include radio bearer information that may be offloaded to the WLAN. The WLAN offloading information may include EPS bearer information that may be offloaded to the WLAN. The WLAN offloading information may include QoS information on traffic steered to the WLAN. The WLAN offloading information may include the amount of data transmitted or received during a predefined period of time. The WLAN offloading information may include the amount of data stored in a buffer.

The WLAN offloading information may be transmitted to the network after the UE initiates an RRC connection establishment procedure. The WLAN offloading information may be transmitted to the network after the UE has successfully completed the RRC connection establishment procedure. The WLAN offloading information may be transmitted to the network after the UE receives a request for the WLAN offloading information from the network. The WLAN offloading information may be transmitted to the network after the UE receives an RAN/WLAN aggregation command. The WLAN offloading information may be transmitted to the network when an event report condition for WLAN measurement is satisfied. The WLAN offloading information may be transmitted to the network when the WLAN offloading information is changed.

The UE may receive a traffic steering deactivation message from the network, and the traffic steering deactivation message may be a message for prohibiting UE-based traffic steering. The UE may stop UE-based traffic steering. Also, the UE may steer traffic steered to the WLAN to the RAN.

The UE may receive a traffic steering activation message from the network, and the traffic steering activation message may be a message for allowing UE-based traffic steering. The traffic steering activation message may be a UE-specific message. The traffic steering activation message may be a cell-specific message.

The UE may receive an RAN/WLAN aggregation start command from the network. When there is traffic steered to the WLAN, the UE may stop UE-based traffic steering. Then, the UE may steer the traffic steered to the WLAN to the RAN.

The UE may receive an RAN/WLAN aggregation stop command from the network. The UE may resume UE-based traffic steering.

Figure 18:
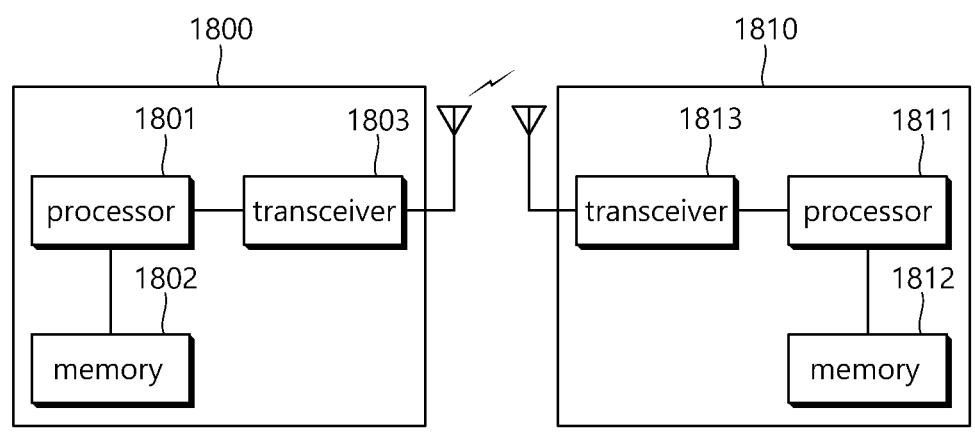
FIG. 18 is a block diagram illustrating a wireless communication system according to the embodiment of the present invention.

FIG. 18 is a block diagram illustrating a wireless communication system according to the embodiment of the present invention.

A BS 1800 includes a processor 1801, a memory 1802 and a transceiver 1803. The memory 1802 is connected to the processor 1801, and stores various information for driving the processor 1801. The transceiver 1803 is connected to the processor 1801, and transmits and/or receives radio signals. The processor 1801 implements proposed functions, processes and/or methods. In the above embodiment, an operation of the base station may be implemented by the processor 1801.

A UE 1810 includes a processor 1811, a memory 1812 and a transceiver 1813. The memory 1812 is connected to the processor 1811, and stores various information for driving the processor 1811. The transceiver 1813 is connected to the processor 1811, and transmits and/or receives radio signals. The processor 1811 implements proposed functions, processes and/or methods. In the above embodiment, an operation of the UE may be implemented by the processor 1811.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for deactivating, by a user equipment (UE), UE-based traffic steering in a wireless communication system, the method comprising:
performing the UE-based traffic steering;
transmitting Wireless Local Area Network (WLAN) offloading information indicating a Radio Access Network (RAN)/WLAN interworking state to a network;
receiving a RAN/WLAN aggregation start command from the network; and
deactivating the UE-based traffic steering when there is traffic steered to the WLAN,
wherein the UE-based traffic steering is traffic steering based on a RAN rule or Access Network Discovery and Selection Functions (ANDSFs).

2. The method of claim 1, further comprising receiving, by the UE, a traffic steering deactivation message from the network,
wherein the traffic steering deactivation message is a message for prohibiting the UE-based traffic steering.

3. The method of claim 2, further comprising stopping, by the UE, the UE-based traffic steering.

4. The method of claim 3, further comprising steering, by the UE, traffic steered to the WLAN to a RAN.

5. The method of claim 1, further comprising receiving, by the UE, a traffic steering activation message from the network,
wherein the traffic steering activation message is a message for allowing the UE-based traffic steering.

6. The method of claim 5, wherein the traffic steering activation message is a UE-specific message.

7. The method of claim 1, further comprising steering, by the UE, the traffic steered to the WLAN to a RAN.

8. The method of claim 1, further comprising receiving, by the UE, a RAN/WLAN aggregation stop command from the network.

9. The method of claim 1, wherein the WLAN offloading information comprises at least one of serving access point (AP) information, access point name (APN) information steered to the WLAN, packet data network (PDN) information steered to the WLAN, radio bearer information to be steered to the WLAN, evolved packet system (EPS) bearer information to be steered to the WLAN, APN information to be offloadable to the WLAN, PDN information to be offloadable to the WLAN, radio bearer information to be offloadable to the WLAN, EPS bearer information to be offloadable to the WLAN, and quality of service (QoS) information on traffic steered to the WLAN.

10. The method of claim 1, wherein the WLAN offloading information comprises an amount of data transmitted or received during a predefined period of time.

11. The method of claim 1, wherein the WLAN offloading information is transmitted to the network after the UE initiates a radio resource control (RRC) connection establishment procedure, after the UE has successfully completed the RRC connection establishment procedure, after the UE receives a request for the WLAN offloading information from the network, or after the UE receives a RAN/WLAN aggregation command.

12. The method of claim 1, wherein the WLAN offloading information is transmitted to the network when an event report condition for WLAN measurement is satisfied or when the WLAN offloading information is changed.

13. A user equipment (UE) for deactivating UE-based traffic steering in a wireless communication system, the UE comprising:
  a memory;
  a transceiver; and
  a processor connected to the memory and the transceiver, wherein the processor is configured to:
    perform the UE-based traffic steering;
    control the transceiver to transmit Wireless Local Area Network (WLAN) offloading information indicating a Radio Access Network (RAN)/WLAN interworking state to a network;
    control the transceiver to receive a RAN/WLAN aggregation start command from the network; and
    deactivate the UE-based traffic steering when there is traffic steered to the WLAN, and
  wherein the UE-based traffic steering is traffic steering based on a RAN rule or Access Network Discovery and Selection Functions (ANDSFs).

* * * * *